(12) United States Patent
Woitoll et al.

(10) Patent No.: US 10,898,848 B2
(45) Date of Patent: *Jan. 26, 2021

(54) AIR FILTER FOR THE INTERIOR AIR OF CABINS OF VEHICLES, AGRICULTURAL, CONSTRUCTION, AND WORK MACHINES

(71) Applicant: MANN+HUMMEL GmbH, Ludwigsburg (DE)

(72) Inventors: Ina Woitoll, Hemmingen (DE); Joachim Stinzendoerfer, Speyer (DE); Angelika Gohle, Schwegenheim (DE); Manfred Winter, Bad Rappenau (DE); Andreas Scope, Oberschoena (DE); Dieter Weiss, Gefrees (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,680

(22) Filed: Oct. 22, 2018

(65) Prior Publication Data

US 2019/0193016 A1 Jun. 27, 2019

Related U.S. Application Data

(63) Continuation of application No. 14/943,195, filed on Nov. 17, 2015, now Pat. No. 10,105,636, which is a (Continued)

(30) Foreign Application Priority Data

May 17, 2013 (DE) .................. 10 2013 008 392

(51) Int. Cl.
*B01D 53/02* (2006.01)
*B01D 53/04* (2006.01)
(Continued)

(52) U.S. Cl.
CPC ..... *B01D 53/0415* (2013.01); *B01D 46/0036* (2013.01); *B01D 46/2411* (2013.01);
(Continued)

(58) Field of Classification Search
CPC ........ B01D 2253/102; B01D 2275/105; B01D 46/0036; B01D 46/2411; B01D 46/528; B01D 53/0415
See application file for complete search history.

(56) References Cited

U.S. PATENT DOCUMENTS 4,610,702 A * 9/1986 Krantz ............... B01D 46/0036
55/300
5,997,619 A * 12/1999 Knuth ...................... A61L 9/20
55/356

(Continued)

FOREIGN PATENT DOCUMENTS

CN 202078811 U 12/2011

*Primary Examiner* — Christopher P Jones
(74) *Attorney, Agent, or Firm* — James Hasselbeck

(57) ABSTRACT

The invention relates to an interior air filter element (10) for a driver's cabin (302) of agricultural and work machines, particularly having sprinkling or spraying devices for pesticides or fertilizers including a filter body (12) having an adsorption filter region (50) and a fine filter region (80) particularly for separating aerosols, wherein the filter body 12 is designed as a winding body having at least one winding layer.

15 Claims, 9 Drawing Sheets

Related U.S. Application Data continuation of application No. PCT/EP2014/060097, filed on May 16, 2014.

(51) Int. Cl.
*B01D 46/00* (2006.01)
*B01D 46/24* (2006.01)
*B01D 46/52* (2006.01)

(52) U.S. Cl.
CPC ...... *B01D 46/528* (2013.01); *B01D 2253/102* (2013.01); *B01D 2275/105* (2013.01)

(56) References Cited

U.S. PATENT DOCUMENTS

| | | | |
|---|---|---|---|
| 7,291,205 B2* | 11/2007 | Chu | F24F 3/1411 422/186.3 |
| 9,908,070 B2* | 3/2018 | Carrion | B01J 19/14 |
| 2002/0074292 A1* | 6/2002 | Schlegel | B01D 15/00 210/681 |
| 2003/0010002 A1* | 1/2003 | Johnson | B01D 39/1623 55/486 |
| 2004/0255783 A1* | 12/2004 | Graham | A47L 9/122 96/69 |
| 2015/0052865 A1* | 2/2015 | Jackson | B01D 46/0024 55/487 |

* cited by examiner

AIR FILTER FOR THE INTERIOR AIR OF CABINS OF VEHICLES, AGRICULTURAL, CONSTRUCTION, AND WORK MACHINES

CROSS-REFERENCE TO RELATED APPLICATIONS

This application is a continuation of application Ser. No. 14/943,195, filed 17 Nov. 2015 which is a continuation of international application No. PCT/EP2014/060097, having an international filing date of 16 May 2014 and designating the United States, the international application claiming a priority date of 17 May 2013, based on prior filed German patent application No. 10 2013 008 392.3, the entire contents of the aforesaid US application, the aforesaid international application and the aforesaid German patent application being incorporated herein by reference.

TECHNICAL FIELD

The invention relates to interior air filter, in particular for air supplied to a driver's cabin in vehicles, agricultural machines, construction machines, and work machines.

BACKGROUND

An air filter is known from WO 00/33940 A1 that combines an outer layer of activated carbon with a layer of a HEPA filter.

However, the filter action of this filter may not be sufficient for applications in which, for example, high concentrations of pesticides or (liquid) fertilizer concentrations escape into the surrounding air, in particular with regard to spraying equipment for these substances. This can be particularly disadvantageous for drivers or operators in the application of liquid pesticides and/or fungicides using agricultural or forestry tractors and self-driving pest management equipment.

SUMMARY

The object of the invention is therefore to provide an interior air filter that has an improved filter effect with regards to dusts, aerosols, and vapors occurring in the operation of agricultural equipment, in particular those of pesticides and fungicides.

This object is attained by an interior air filter element for a driver's cabin of agricultural and work machines, in particular with sprinkling or spraying devices for pest control substances or fertilizers, including a filter body having at least one adsorption filter region, in particular for the separation of gases, as well as at least one fine filter region, in particular for the separation of aerosols, with at least the adsorption filter region of the filter body being designed as a winding body having at least one winding layer and surrounding a central flow region. Even more preferably, the fine filter region may also be designed as a winding body or integrated into the wind of the adsorption filter body as a layer.

It is preferable for the inner air filter element to be passable exclusively in a radial direction. This means that the fluid to be cleaned is either able to flow outward from the central flow area through the cylindrical filter body and outward or, in the opposite direction, from the outer surface, particularly cylindrical, of the interior air filter element through the cylindrical filter body and inward into the central flow area.

As the adsorbent in the adsorption filter region, a single adsorbent may be provided or a mixture of various adsorbents or even a mixture with other materials such as, for example, at least one adsorbent. The adsorbent may, in particular, be activated carbon and/or at least one material from the group zeolites, silica gels, metal oxides, molecular service, layered silicates, nanoclays. In addition, one or more ion exchangers may also be provided.

Additional advantages in the use of different adsorbents may be seen in the individual adaptation of the adsorption performance to the requirements of certain gases. When adsorbents are used that chemically bond to noxious gases, the later desorption of the noxious gases may be prevented. By the spatial arrangement of the materials, additional advantageous effects may be exploited. For example, the first layer may function as a protective layer, in particular a specialized material with a high affinity and capacity for a gas A may be used. Thus, the layers disposed therebelow (for example, activated carbon with a broad effect) are protected from gas A, which improves the adsorption performance for a gas B (that is similar to the gas A) because none of the pores are being blocked by the gas A, thus preventing two types of molecules from competing for pores of the same size in the activated carbon.

It is advantageous for wound layers (winding layers) to be formed without separate grooves or spacers as are found in closed, pleated filter bodies or in the use of pressed filter media and without defined through-flow channels, which facilitates the production and handling of the filter element. The filter does not require the reciprocal sealing of through-flow channels, which simplifies production. Conventional filter elements having filter bodies made of pleated filter elements do not offer the necessary contact time to ensure the reliable adsorption and/or absorption of toxic substances due to their high rates of flow, which is critical for the functionality of a filter for gas purification as well as filtration efficiency and/or adsorption efficiency. This is particularly true for filter elements with a high throughput of the medium to be filtered. By structuring the filter body as a wound body having one or more wound layers, the filter element offers a sufficiently long contact time of the medium to be filtered with the adsorbents, which are then able to clean the medium to be filtered.

The filter element according to the invention may be used in particular for the driver's cabin of agricultural equipment and working machines, in particular with sprinkling devices were spraying devices for pest control substances or fertilizers. Due to the combination of an adsorption filter region and a fine filter region, it is possible to achieve significantly improved air quality in the interior of the driver's cabin even in the toxin-heavy environments discussed above. In the adsorption filter region, hazardous and/or noxious gases are particularly bonded, and find dusts, vapors, and aerosols are removed from the breathable air in the fine filter region disposed upstream or downstream of the adsorption filter region. The arrangement of the fine filter region may be preferably provided upstream of the adsorption filter region.

According to a favorable embodiment, a filter medium that is unfolded or folded in a zigzag shape having glass fibers, in particular a glass fiber filter medium preferably provided with one or two protective layers made of a spun-bonded fabric, may be provided for the fine filter region. The filter medium is suitable for the efficient removal of aerosols.

According to a favorable embodiment, an entry-side pre-filter region may particularly be provided for the removal of dusts. A combination of a pre-filter region, fine filter region, and adsorption filter region results in highly efficient filter element having a high safety standard.

According to a favorable embodiment, a filter medium that is unfolded or folded in a zigzag shape made of cellulose, plastic foam, or nonwoven, for example, plastic nonwoven, may be provided. The filter medium may particularly also comprise a single- or multi-layer combination of layers of such filter media. The filter medium is suitable for the efficient removal of particles.

According to another favorable embodiment, the pre-filter region may also be embodied as a wound body or be integrated into the wind of the adsorption filter as a layer.

According to a favorable embodiment, the adsorption filter region may be made of a partially finished product made of at least one carrier layer and at least one fixed adsorption layer having at least one adsorbent. Fixing or immobilizing the adsorbent in the absorber layer prevents the entrainment of particles from the adsorption filter region.

According to a favorable embodiment, the wound body may be wound on a tube element that remains in the wound body as a support body. In this manner, the production process of the filter element may be simplified. It is advantageous for the tube element itself to be a pre-filter region and/or a fine filter region. Alternately, the wound body may also be wound on a pin that is removed after winding.

According to a favorable embodiment, the filter medium of the pre-filter region and/or of the fine filter region may be integrated into the wound body, in particular as a carrier layer or another layer in addition to the carrier layer. In this manner, the filter efficiency can be increased; moreover, in this manner and integrated interior air filter structure may be produced in a simple and cost-effective fashion. Because a plurality of sequential layers of filter medium may be shown in this manner for the pre-filter region and/or the fine filter region, it is possible for the medium to be filtered, for example, air, to pass through the respective filter medium of the pre-filter region and/or fine filter region multiple times. Thus, it is possible to improve filtration efficiency. In particular, the throughput direction of the filter element may be directed from the inside to the outside relative to the wound body or from the outside to the inside.

In addition to the wall thickness of the wound body, i.e., the filter element, that results from the number of wound layers in the filter element and the thickness of each wound layer, the shape of the wound filter is variable as well. In addition to the conventional circular shape, other cross-sections are possible as well, such as elliptical, triangular, and polygonal. These shapes may be obtained in a simple manner by winding a flat carrier layer onto a suitable inner core. This allows for an optimal use of available space.

The design of the interior air filter element is uncomplicated and robust and allows a long service life in use. Moreover, filter properties may be predetermined, for example, by the targeted distribution of additional components in the at least one winding direction in the radial and/or also axial direction of the filter element.

It is favorable for the interior air filter element to comprise a circumferential seal for separating the pre-filtration side from the filter side upon installation in a filter housing.

Additionally, in one embodiment, an upstream pre-filter layer, in particular for the removal of dusts, may be provided. This layer is connected upstream of the adsorption filter region with one adsorbent wound layer or a plurality of absorber wound layers and the fine filter layer and disposed on the pre-filter side of the interior air filter element. Thus, reliable functionality of the adsorption filter region and the fine filter region can be insured even in very dusty environments and the amount of dust in the intake air can be reduced.

In the case of activated carbon as an adsorbent, for example, activated carbon may be obtained from wood or hard coal, polymer based, tar based, or coconut shell based. In a favorable embodiment, ion exchanger pellets are used as the base material for the activated carbon that are produced on a polymer basis, for example, from synthetic resins, in particular from polystyrenes cross-linked with divinyl benzenes.

In one embodiment, a hydrophobic adsorbent, in particular hydrophobic activated carbon, may be used as an adsorbent. Hydrophobic adsorbents are particularly understood to be those that have a comparably low water absorbing capacity. For example, and adsorbent, for example, an activated carbon, is preferably used that, at a relative humidity of 50%, has a water absorption of <10% by mass, in particular based on the adsorbent branch of isotherms. It is particularly preferable for this water absorption to be <5% by mass.

In one embodiment, the adsorbent may have a BET surface area greater than 600 $m^2/g$, preferably greater than 800 $m^2/g$ (preferably measured in accordance with DIN ISO 9277:2003-05). This allows sufficient adsorption to be insured in a small available space.

In one embodiment, the adsorbent may be used in a free-flowing or pourable form, for example, in the form of granular or pellet-like or otherwise shaped particles. The adsorbent particles preferably have particle sizes (average diameter) between 0.1 and 1 mm, preferably 0.2 to 0.7 mm, and may, for example, be present in the form of small rods, granulate, or pellets, for example, in the form of granulated activated carbon or pelletized activated carbon.

An adsorbent is defined as a highly porous, preferably solid, preferably not nonwoven, and preferably pourable material that, due to its inner surface is suitable for the selective concentration of certain substances on its boundary surface from gaseous or fluid mixtures, in particular from air loaded with gaseous or fluid substances. Examples of this are activated carbons, aluminum oxide, silica gel, silicon oxide, zeolites, silica gel, or synthetic adsorber resins.

In one embodiment, a filter medium that is flat or folded in a zigzag shape may be used as a prefilter region. This medium may be made of cellulose, plastic foam, or nonwoven, or a single- or multilayer combination of layers of such filter media.

A plastic foam filter media layer for the prefilter region may, for example, be made of a reticulated foam, in particular polyurethane foam, for example, on a polyether or polyester basis or comprise one or more layers of said foam. Volumetric weights of such foams can lie in the range of 20 to 70 $kg/m^3$.

A cellulose filter medium with epoxide impregnation may be used as a cellulose filter medium for the prefilter region. It is preferable for the cellulose filter medium to have a surface weight of 80 to 120 $g/m^2$. In a preferred embodiment, the filter medium has a maximum pore size in the range of 30 to 40 µm and/or an air permeability of approximately 100 to 400 $L/m^2$ s, respectively measured at a pressure differential of 200 Pa (preferably measured here and in the following in accordance with DIN EN ISO 9237). In this manner, the subsequent layers can be protected from dust deposits, thus preserving their function. In one embodiment, the impregnated content, i.e., the portion by weight of the impregnating medium of the surface weight of the filter medium, is between 15 and 30%.

It is preferable for a combination of a spunbonded fabric layer and a meltblown layer (nonwoven made of meltblown plastic fibers) to be used as the nonwoven filter medium. Both layers may respectively be made of polyamide (PA), polyester (PES), polycarbonate (PC), or polypropylene (PP). The nonwoven filter medium preferably has a surface weight between 60 and 140 g/m², preferably between 80 and 120 g/m² and/or thickness in the range of 0.5 to 1 mm, particularly preferably from 0.5 to 0.8 mm. It is further preferable for the air permeability to be in the range of 1000 to 2000 L/m² s, particularly preferably between 1200 and 1800 L/m² s at a pressure differential of 200 Pa.

In one embodiment, the prefilter region has a filtration efficiency, particularly in accordance with ISO 5011, of 99% for the test piece PTI fine, in particular in accordance with ISO 14269-4.

In a favorable embodiment, the prefilter region has a grammage of 75 to 125 g/m². Preferably, the filter medium of the prefilter region has an air permeability of 100 to 200 L/m² s at a pressure differential of 200 Pa.

The use of the prefilter region allows the adsorption filter region and the fine filter region to be protected from too great of a dust buildup. In this manner, their function (gas separation for the adsorption filter region and aerosol separation for the fine filter region) is impeded to the smallest degree possible, even in the case of very dusty intake air.

An open-pore foam with a free-flowing adsorbent, for example, pourable activated carbon, may be provided for the adsorption filter region. Here, for example, reticulated foams, for example, made of plastics such as polyurethane, polyurethane ether, or polyurethane ester are used. It is preferable for the poor sizes of the foam to lie between 20 and 50 ppi (ppi=pores per inch) or between 0.5 and two pores per millimeter. Measurement occurs in a comparative optical process in which a completely formed pore is defined under the microscope as a "standard pore" and the pores occurring over a section are compared therewith and counted. Pores that are not completely formed in comparison to the standard pore are counted on a percentage basis. In this foam, it is preferable for adsorbent particles to be added and preferably fixed. The adsorbent particles here are preferably fixed in the foam by means of an adhesive, for example, by means of a polyurethane-based two-component adhesive. This may be achieved, for example, by virtue of the fact that the foam is first impregnated with an adhesive and subsequently, before the adhesive dries or cures, adsorbent particles are poured in, in particular while the foam is being shaken. Here, a two-component adhesive, a hot melt adhesive, or an aqueous adhesive may be used.

In one embodiment, for a partially finished product from which the adsorption filter region is wound, one layer of a fixed (immobilized) filling is provided having an adsorbent or a mixture of a plurality of adsorbents or a mixture of at least one adsorbent and at least one adsorbent. The partially finished product may be realized in a single-layer or multi-layer structure. The term fixed (immobilized) filling refers to an arrangement in which a carrier layer is provided and a filler layer of, for example, adsorbent particles is fixed thereon. A plastic expanded lattice or a layer of a flat material such as a particle filter medium, for example, may be used as the carrier layer. In a favorable embodiment, a nonwoven made of a spunbonded or melt-blown polyester fibers, for example, PET fibers (polyethylene terephthalate) or PBT fibers (polybutylene terephthalate) is used as the carrier layer. This may have a surface weight of 25 to 120 g/m², preferably 50 to 100 g/m², particularly preferably 65 to 85 g/m² and an air permeability >3000 L/m² s, preferably >5000 L/m² s at a pressure differential of 200 Pa. The air permeability is particularly measured in accordance with ISO 9347. The adsorbent particles are applied to the carrier layer, for example, as a pour and preferably fixed onto the carrier layer by means of a fine adhesive application. This occurs, for example, in the form of a plurality of adhesive points applied to the carrier layer or by means of a net of adhesive fibers applied between the carrier layer and the pour layer and/or between the pour layers during pouring and/or onto the pour layer. The pour layer preferably has an overlay of 100 to 1200 g/m² adsorbent particles, in particular activated carbon, on the carrier layer. Preferably, 800 to 1000 g/m² are used. The layer of a fixed pour with carrier layer and pour layer preferably has an air permeability in the range of 800 to 1200 L/m² s, in particular between 900 and 1100 L/m² s, and a surface weight in the range of 850 to 1250 g/m², in particular between 950 and 1150 g/m² at a layer thickness particularly in the range of 2 to 6 mm.

In this manner, a stable, easy to process, and high-performance layer of fixed pour is provided that can also be combined to form multilayer partially finished products and wound to form a wound body.

In one embodiment, for the partially finished product from which the adsorption filter region is wound, an unfolded layer structure composed of a carrier layer, cover layer, and a free-flowing adsorbent placed therebetween is used. Thus, the partially finished product is formed with one carrier layer and one cover layer and an adsorber layer disposed therebetween. Such partially finished products may be used in turn to increase filtration performance by winding the coated carrier layer multiple times around itself, such that the wall thickness of the wind, for example, corresponds to between 2 and 20 partially finished products, preferably between 5 and 15 partially finished products.

The cover layer may be disposed directly on the adsorber layer and, for example, comprise a plastic matrix or a layer of a flat material, for example, a particle filter medium or be composed thereof. In a preferred embodiment, a nonwoven made of a spunbonded or melt-blown polyester fibers is used. This may have a surface weight of 25 to 120 g/m², preferably 50 to 100 g/m², particularly preferably 65 to 85 g/m² and an air permeability >3000 L/m² s, preferably >5000 L/m² s.

In one embodiment, the adsorber layer has a layer structure made of multiple fixed (immobilized) pours. Thus, for example, a first layer of a fixed pour may be laid with the side on which the adsorber is disposed (adsorber side) on the adsorber side of a second layer of a fixed pour and be connected thereto, for example, by adhesion. Thus, a partially finished product is formed having to carrier layers were cover layers and adsorber layers disposed therebetween. Such partially finished products may be used in turn to increase the filtration performance by winding the partially finished product multiple times around itself, which results in an advantageous wall thickness of the wind corresponding to a thickness of, for example, between 2 and 10 partially finished products, preferably between 3 and 7 partially finished products. Other arrangements are also conceivable as an alternative or in combination in which the respective carrier layer of a layer of a fixed pour is placed on the adsorber layer of another fixed pour. This arrangement may then be completed by a reversed layer with fixed pour or a cover layer. For example, between 4 and 20 layers of a fixed pour may be disposed one atop the other.

Preferably, the variants described above may be used to form multiple adsorption filter layers in a layer structure including a carrier layer, a cover layer, and at least one pourable adsorbent disposed therebetween a wound overall adsorption filter layer. Here, particularly between 2 and 30, preferably between 5 and 15 layers of partially finished product or fixed pour are disposed one over the other to form the overall adsorption filter region by winding one atop the other and the wound body is optionally sealed on the face by means of a connector medium. A connector medium may be, for example, an adhered, sprayed on, or welded on plastic part, or a casting compound cast on by means of a casting mold on the face sides, particularly made of polyurethane. Moreover, a sealing mass that swells in heat, for example, present in the form of a film containing nitrile rubber and phenol resin, may also be used as a connector medium. This medium may be placed against the wound body and heated, whereby the mass connects to the wound body upon swelling and subsequently cures. The connector medium may preferably be embodied as an end plate.

In one embodiment, the adsorber layer comprises two regions with different adsorbents densities. Here, it is preferred for a region with a higher adsorbent density to be disposed on the output side and a region with a lower adsorbent density to be disposed on the intake side. This may be achieved, for example, by placing two layers of different adsorbent-filled foam one on to the other, with the output-side layer being filled with a higher amount of adsorbent than the intake-side layer. Alternatively, as described above in different variants, a layer structure of layers with fixed pour amounts of adsorbent particles may be used in which one or more output-side layers or levels, which particularly seal the layer structure in the direction of the output side, have a higher density of adsorbent. This may be achieved, for example, in the case of identical materials for carrier layers, adsorbent layers, and cover layers, by calendaring the downstream-side layers, in particular before, during, or after the curing of the adhesive, in such a way that the layer thickness is reduced, thus increasing the adsorbent density. However, for the layer(s) with higher adsorbent density, a granulate, for example, an activated carbon granulate, may also be used that has a greater bulk density than the one used for the layers with a lower density. This may be realized either by activated carbons with varying specific densities or by different geometries of the adsorbent particles. Thus, a blocking layer is particularly formed that is able to reliably allow the removal of residual concentrations of toxic gases. This allows an additional degree of safety to be provided for the user.

In a preferred embodiment, the adsorber layer comprises a downstream-side region including one or more particularly calendared layers of a fixed pour. This layer or these layers particularly comprise an overlay of activated carbon of 100 to 1200 $g/m^2$ adsorbent particles on the carrier layer. Preferably, 800 to 1000 $g/m^2$ are used. To this end, the layer of a fixed pour with carrier layer and adsorber layer preferably has an air permeability in the range of 800 to 1200 $L/m^2$ s, particularly between 900 and 1100 $L/m^2$ s and the surface weight in the range of 850 to 1250 $g/m^2$, in particular between 950 and 1150 $g/m^2$ with a layer thickness particularly in the range of 1 to 3 mm. It is particularly preferable for these layers or this layer to have in the downstream-side region with the greater adsorbent density essentially the same overlay of adsorbent particles relative to the surface weight and/or the type of adsorbent particles as the preceding, upstream-side layers with a lower adsorbent density. It is further preferable for this layer or these layers to have a significantly lower layer thickness than the preceding upstream-side layers with a lower adsorbent density. The layer thickness may, for example, be less than two thirds of the thickness of the preceding upstream-side layers with a lower adsorbent density, preferably between 40% and 60% of the thickness of the preceding upstream-side layers. To this end, for example, the layer or the layers with a higher adsorbent density are compressed by a calendaring step or a similar process such that a corresponding reduction in thickness is obtained relative to the unprocessed layer. In this manner, it is possible for the various regions with different adsorbents densities to be produced from the same raw materials, with only an additional calendaring step being necessary to produce the layers with a higher adsorbent density.

In a favorable embodiment, a pour of adsorbent particles is used for the layer or layers with a greater adsorbent density that has a greater bulk density as compared to the preceding, upstream-side layers with a lower adsorbent density. Here, it is preferable for the bulk density in comparison to the upstream-side layers with a lower adsorbent density to be 50% higher, particularly preferably to be 100% higher.

In a favorable embodiment, a pour of adsorbent particles is used for the layer or layers with a greater adsorbent density that, as compared to the preceding upstream-side layers with a lower adsorbent density, has a lower average particle diameter, in particular a particle diameter that is 50% lower, particularly preferably a particle diameter that is 65% lower.

In one embodiment, the upstream-side layers with a lower adsorbent density have adsorbent particles having a particle diameter in the range of 0.7 to 1.2 mm.

In one embodiment, the layer or layers with a greater adsorbent density have a pour of adsorbent particles with a particle diameter in the range of 0.3 to 0.7 mm.

Using the embodiments of the adsorber layer described above, it is particularly possible for an even distribution of the at least one adsorbent in the wound adsorbent filter region to be achieved that is also guaranteed during operation, for example, while being subjected to vibrations. This contributes to the provision of a reliable filter element.

Using the filter medium according to the invention for an adsorption filter region, it is particularly possible for interior air filter element having an adsorption filter region to be provided that is particularly easy to process in particular, and the interior air filter element may be provided. In particular, an interior air filter element may be provided that achieves on the downstream side a test the gas concentration of less than 10 µg/g according to the cyclohexane method in accordance with EN 12941:1998 with a test duration of 70 minutes measured according to EN 15695-2:2009.

In one embodiment, a filter medium is used as the fine filter region that is unfolded or folded in a zigzag shape and that has glass fibers in a glass fiber layer. Here, for example, a glass fiber nonwoven or glass fiber paper may be used. This preferably has a cover layer made of a spunbonded fabric laminated on one side or both sides. This achieves in particular a mechanical protection of the glass fiber medium, which is often quite sensitive. This is particularly advantageous when the glass fiber layer is folded because this particularly allows the medium to be protected from damage caused by folding, which may lead to local leakage or to tears. Moreover, such cover layers can serve to improve the mechanical stability of the fine filter region.

In one embodiment of the fine filter region, the glass fibers have a fiber diameter in the region of 800 nm to 5 µm. It is preferable for 90% of the fibers to have a fiber diameter within this range. Preferably, fibers are present that have fiber diameters essentially in the entire fiber diameter range.

It is preferable for the average fiber diameter to lie within the above-mentioned range. The fiber diameters may be measured, for example, according to the method described in DE 10 2009 043 273 A1 or US 2011/0235867 A1. The filter medium of the fine filter region preferably has a surface mass between 60 and 100 g/m², particularly preferably between 75 and 90 g/m². A glass fiber layer preferably has a thickness of 0.2 to 1 mm, particularly preferably from 0.3 to 0.6 mm. It is particularly preferred for a glass fiber layer to be used that, at a flow rate of 7.5 cm/s, produces a resistance in the range of 300 to 600 Pa, preferably between 400 and 500 Pa.

In one embodiment, the spunbonded fabrics of the cover layer(s) are particularly formed from a polyester or polypropylene or polyamide as the basic material.

In one embodiment, the spunbonded fabrics of the cover layer(s) have surface masses in the range of 10 to 250 g/m², preferably 20 to 60 g/m², and particularly preferably 30 to 34 g/m². Preferred thicknesses for the cover layers lie in the range of 0.1 to 0.3 mm.

In one embodiment, the spunbonded fabric of the cover layer(s) is embodied as continuous filaments that are stretched by means of tempered air and/or godets and placed in a random fashion on a transport belt. Subsequently there to a calender process may optionally occur for the purpose of creating a bonded fabric and/or influencing the nonwoven surfaces.

Instead of glass fibers, plastic fibers may also be used for the fine filter region. In one embodiment, such a synthetic HEPA medium is used instead of the glass fiber media described above. Polyester or polypropylene or polyamide may be used as the raw material in this instance. Here, fiber layers may be preferably formed as nonwovens and, for example, produced in an electrospinning process, in a meltblown process, or in some other manner. Due to the material properties of synthetic filter media, it is advantageous for cover layers and protective layers to be omitted. It is preferable for a layer made of meltblown nonwoven polyester to be used having a surface mass of, for example, 80 to 120 g/m² and the thickness of, for example, approximately 0.4 to 0.8 mm. This layer is more preferably applied to the carrier layer. A plastic support lattice or a spunbonded layer, for example, may be considered as the carrier layer. The other properties may correspond to those of the fine filter layers using glass fibers described above.

In one embodiment, the prefilter region and the fine filter region are integrated into a filter bellows particularly having one or more layers of a prefilter medium placed one atop another and one or more layers of a fine filter medium.

In one embodiment, a cover layer is laminated only on one side on a glass fiber layer; on the other side, the prefilter medium is directly laminated. This layer combination may either be integrated into the interior air filter element in the flat manner or be folded in a zigzag pattern as an entire layer combination and form a filter bellows. In this manner, an interior air filter element having a plurality of filter stages may be provided with a low installation expense and in a small available space.

Cover layers and/or prefilter layers or prefilter region may be applied to the glass fiber layer in different fashions. Here, for example, spray adhesives, for example, in an aqueous suspension, for example, on a PU basis, may be used. Alternatively, hot melt adhesives may be used that are sprayed on, applied in powder deposition processes, or by spreading, for example, in the form of adhesive nonwovens or adhesive lattices between the layers that melt during calendaring in a fixing step and subsequently cure, thus producing a permanent connection. In particular, this allows a secure connection between the gas fiber layer and cover layers to be produced that allows the filter medium to be folded.

Using a filter medium according to the invention for a fine filter region particularly allows an interior air filter element to be provided having a fine filter region that may be easily worked into a folded bellows. In particular, and interior air filter element may be provided that achieves an aerosol penetration of 0.05% measured in accordance with EN 15695-2:2009.

In the filter element according to the invention, in the partially finished product with which the wind is formed, the prefilter region and/or adsorption filter region and/or fine filter region may each form a separate partial filter element or be connected to one another wound completely or partially in layers one atop the other.

In one embodiment, the partially finished product that is used for the filter body of the inner air filter element may comprise at least two of the three partial filter elements of the prefilter region, adsorption region, and fine filter region. Each of these may have in a circumferential seal on the edges that is connected to the respective partial filter region in a sealing fashion.

In one embodiment, the circumferential seal may be formed by a circumferential seal profile made of a polymer, in particular of a foamed, particularly closed-pore foam applied by foaming, for example, made of polyurethane foam. If an endplate is also made of such a material, this seal may be made as one piece with the endplate. Alternatively, an injection molded endplate made of thermoplastic plastic may be provided on which the sealing profile, for example, made of a silicon or a thermoplastic elastomer is connected in a dual-component injection molding process. It is preferable for the seal to have a hardness in the range between 5 and 45 Shore A, particularly preferably between 10 and 30 Shore A.

The sealing mass may be applied to the filter element, realizing a seal between the untreated air side and treated air side in a housing.

According to a favorable refinement, the wound adsorber layer and, in particular, the entire filter element may have a seal on the edges. Here, the sealing of the longitudinal edges of the carrier layer may form a face-side endplate. This ensures that the filter element thus formed may be flowed through in an exclusively radial direction. Thus, on both lateral ends of the flat layer along the longitudinal extension of the carrier layer, a seal may occur via a closing element. For example, a closing element may be formed with adhesive, foam, Thermoplast, a welding process, or a combination of the options listed here. The use of hot melt adhesives directly during the winding process is also conceivable if the next wound layer is wound on to the previous wound layer and the hot melt adhesive is still sufficiently liquid in the edge region of the wound layers that it is able to bond in a sealing fashion with the adhesive of the prior wound layer. It is advantageous for two end plates to be provided as the sealing element that seal the face-side end surfaces of the filter regions on their axial ends.

The blocking off and/or sealing on the face ends of the filter element may also occur by means of the sealing element made of plastic, in particular thermoplastic plastic, which may be advantageously embodied as an endplate. This may be melted on one side and, in its melted state, applied to the axial face ends of the filter regions. Melting may occur, for example, by ultrasound, heat reflectors, infrared radiation, or hot air, and the deformation by pressing the sealing element against the face ends and over the outer edges thereof.

In a particularly advantageous embodiment, two end plates are provided as sealing elements of the axial face ends of the filter element that seal off particularly the face ends of the prefilter layer, adsorption filter layer, and fine filter layer directly adjacent to one another.

When using foam (for example, polyurethane-based foam), the sealing (sealing off) in the edge region of the filter element may be obtained by a foam application during the winding process and/or require the use of a sealing mass with a delayed swelling behavior and/or foam behavior, for example, via a slow reaction time or by means of additives that delay the reactionary defined fashion or, for example, a thermal impulse for activating the reaction. Thus, the wind may be sealed during and also after the manufacturing of the wind. An additional option is also the possibility of the use of a separate endplate as is known in oil or fuel filter elements.

The sealing of the ends of the wound layer, i.e., the axial edge of the first and/or last wound layer may also occur in the wound state with the methods discussed above. Thus, the circulation of the at least one adsorbent in the wound layers of the filter element may be ensured and leakages may be prevented.

It is useful for the end region of the wound layers to be fixed on the outer jacket and/or inner jacket of the wound filter elements. This fixing may be structured with a length and/or width of a few millimeters, preferably approximately 5 millimeters to several centimeters. It may occur, for example, by the adhesion of the outermost and/or innermost wound layer onto the wound layer disposed therebelow. Moreover, additional fixing elements are also conceivable such as, for example, adhesive, fixing nets, fixing lattices, rubbers, etc. in addition, a cylindrical element permeable to the medium to be filtered (for example, a lattice, filter medium, or a porous solid material), clips, or fibers, wires, etc. placed into the wound layer may be used, which are then in their extension wound completely at least once around the entire wind of the filter body and connected to the wound layers (filter layer or fibrous wire layer) located therebelow. This connection may occur, for example, by welding, adhesion, sewing, etc.

In a preferred embodiment in which the filter element is disposed in a filter housing, the circulating seal may be pressed or stretched in between two housing parts of the filter housing in an axially or radially sealing fashion. The seal may also be applied radially or axially exclusively on one sealing surface of a housing or housing part in a sealing fashion. The force required for pressing may be applied to the side facing away from the seal via pressing elements such as nubs, beads, etc. or may be embodied as tension rods.

An embodiment of a filter system with a wound filter body is fundamentally possible with and without a housing.

In addition to the adsorption filter region, it is preferable for the prefilter region to be provided for dust filtration and for a HEPA fine filter region to be provided primarily for the removal of aerosols, with the adsorption filter region including at least one wound adsorber layer. The winding may occur, for example, around a central tube that remains in the filter element or around a core that is used as a removable tool. The use of a round filter bellows folded in a zigzag shape and sealed in an annular fashion as the fine filter region that may be used as a basis for winding the adsorber layers is also conceivable.

With regard to the different requirements relating to volume flow and service life, the wound body may be viewed as a construction site in which the cylinder height and the diameter may be used to react to the different requirements while using the same initial components, which advantageously saves on tool costs.

Immobilized adsorbent particles have advantages with regard to mechanical stability and homogeneity of the filter element. Significantly higher retention times of the medium to be filtered in the filter element result, which as a result of the multilayer structure leads to fewer penetrations and greater capacities of the filter element.

The adaptation of the adsorption performance to the respective requirements profile as well as the available space may be optimized via an optimized number of wound layers (i.e., adsorber quantity) and a suitable selection of material.

The invention further relates to an interior air filter system for the driver's cabin of agricultural and work machines, in particular with a spraying or sprinkling unit for pest control media or fertilizers, including an interior air filter element according to the invention and a housing with an air inlet and an air outlet in which the interior air filter element separates the inlet side from the outlet side in a sealing fashion.

The invention further relates to a driver's cabin of the vehicle or a working machine including an interior air filter system according to the invention as well as the use of an interior air filter element or interior air filter system according to the invention in a driver's cabin of a vehicle or a working machine.

In addition to the use for the filtration of interior air in drivers' cabins of agricultural and working machines, in particular with sprinkling or spraying devices for pest control media or fertilizers, the filter element according to the invention may also be used for the filtration of breathable air in other interior spaces such as motor vehicles, aircraft, or the like. In addition, the use of the filter element for the filtration of supply air to various processes such as, for example, supply air to fuel cells, in stationary or mobile applications such as motor vehicles or aircraft, is also conceivable.

Additional possible implementations of the invention also include combinations of the above or below not explicitly named here with regard to the features of the exemplary embodiments or embodiments of the interior air filter element or interior air filter system described here. Here, the person skilled in the art will also add or alter individual aspects as improvements or refinements of the respective basic form.

Additional embodiments of the invention or the subject matter of the subordinate claims and may be found in the description of the exemplary embodiments of the invention below. The invention will be described in greater detail in the following using exemplary embodiments with reference to the attached figures.

BRIEF DESCRIPTION OF THE DRAWINGS

The following are shown by way of example:

FIG. 7b a first embodiment of a partially finished product of an adsorption filter layer formed of two layers according to FIG. 7a;

FIG. 7c a second embodiment of a partially finished product formed of two layers according to FIG. 7a;

DETAILED DESCRIPTION

Figure 1:
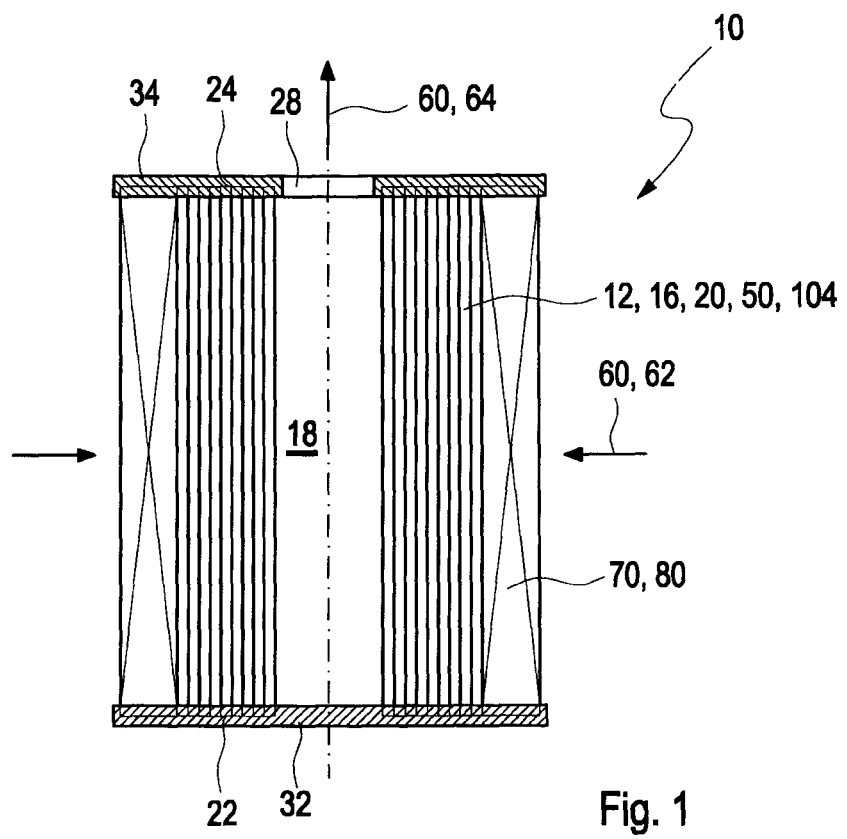
FIG. 1 a longitudinal section of an interior air filter elements having a wound filter body according to a first embodiment with an additional, particularly pleated, filter layer placed around the wind.

In the figures, identical or similar components are assigned the same reference characters. The figures show only examples and are not to be understood as limiting.

In the following exemplary embodiments, activated carbon is used as an adsorbent by way of example. However, the use of other adsorbents is conceivable as well such as seal light, silica gels, metal oxides such as aluminum oxide, copper oxide, or manganese oxide, molecular sieves such as, for example, MOFs, organo-clays, nanoclay(s), or mixtures of adsorbents.

Figure 2:
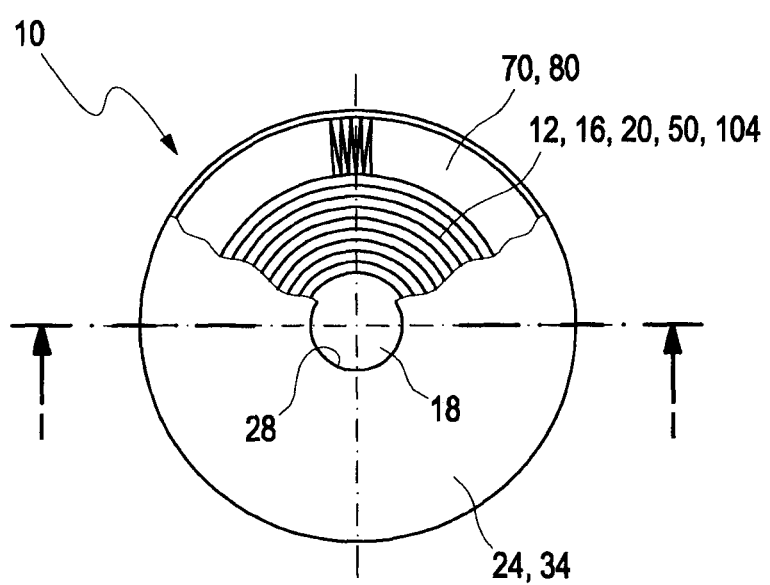
FIG. 2 a partial section of a top view of the interior air filter element according to FIG. 1.

FIGS. 1 and 2 show a first embodiment of the filter elements 10 in order to explain the invention. FIG. 1 shows a sectional view of the filter element 10 according to one exemplary embodiment of the invention in the manner of a filter cartridge having an adsorption filter region 50. A wound partially finished product forms a wound body 20 as the adsorption filter region 50 around an axial channel 18, with the partially finished product including an immobilized absorber layer 104 with activated carbon as the filter medium 16. FIG. 2 shows a frontal view of a partially sectioned face side 24 of the filter element 10.

The wound body is surrounded by an additional filter element that preferably comprises a fine filter element 70 and/or a particle filter element 80. An endplate 32, 34 is provided on each of the face ends 22, 24 that seal the wound body 20 and the fine filter element 70 and/or the particle filter element 80 on the face sides such that a medium 60 to be filtered is able to flow only through the wound layers of the wound body 20 and the surrounding additional filter element 70, 80. Here, the one, for example lower face end 32 is completely closed off and thus seals the channel 18 in the downward direction, while the axially opposite, for example, upper face end 34 has an opening 28 in its center through which the medium 60 can flow.

The additional filter element is embodied, for example, with a pleated filter medium, with only a narrow region or section of the pleated filter medium being shown in FIG. 2 surrounding the wound body 20 of the adsorption filter region 50.

A medium 60 to be filtered, for example, untreated air 62, arrives at the prefiltration side of the filter element 10 through the fine filter element 70 and/or particle filter element 80 into the wound body 20 of the filter body 12 and leaves the filter body 12 on its filtered side and exits as a filtered medium 60, for example, filtered air 64.

Figure 3:
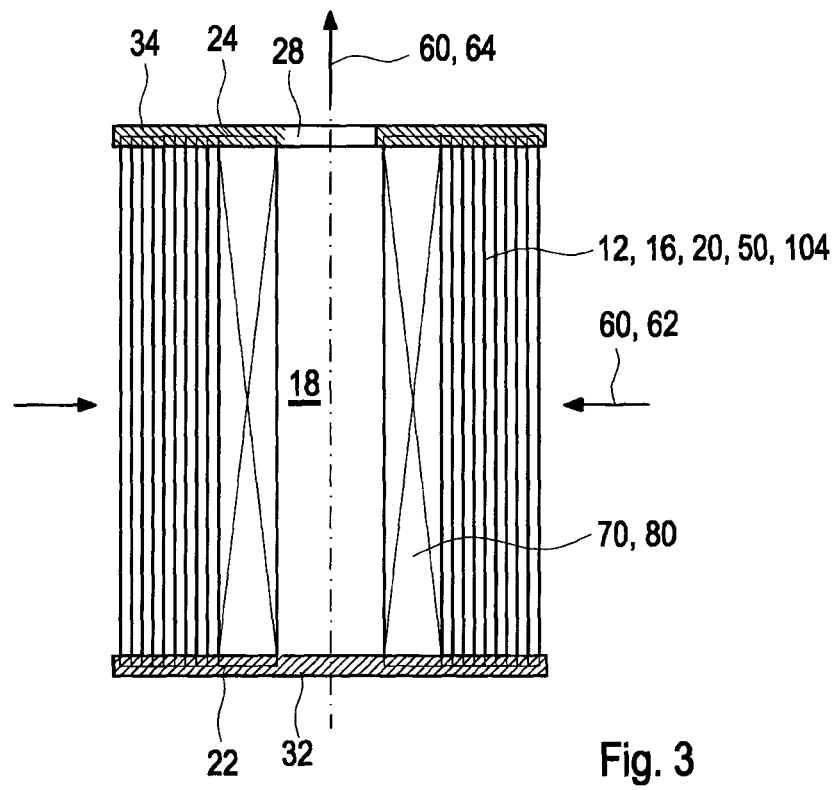
FIG. 3 a longitudinal section of an interior air filter element having a wound filter body according to an additional embodiment with a wind disposed around a filter bellows.
Figure 4:
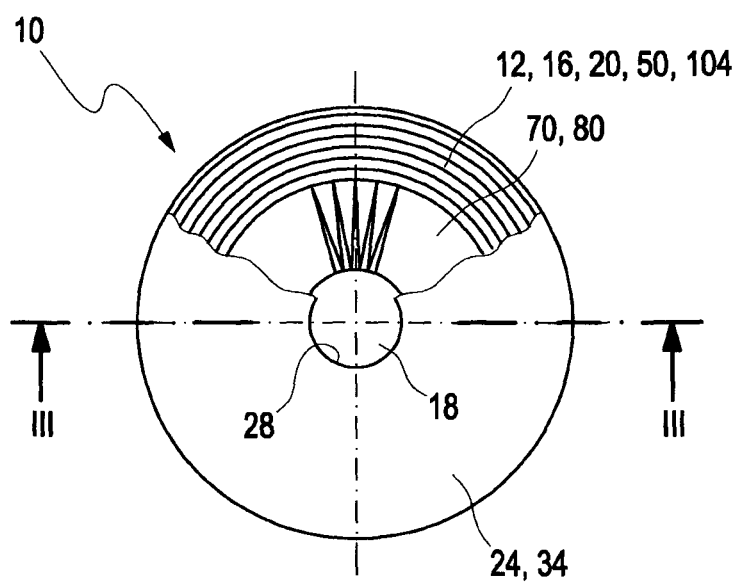
FIG. 4 a partial section of a top view of the interior air filter system according to FIG. 3.

FIGS. 3 and 4 show an inverse embodiment of a filter elements 10 as a sectional view and top view in which the wound body 20 with the adsorption filter region 50 surrounds the further filter element with the fine filter element 70 and/or the particle filter element 80.

Figure 5:
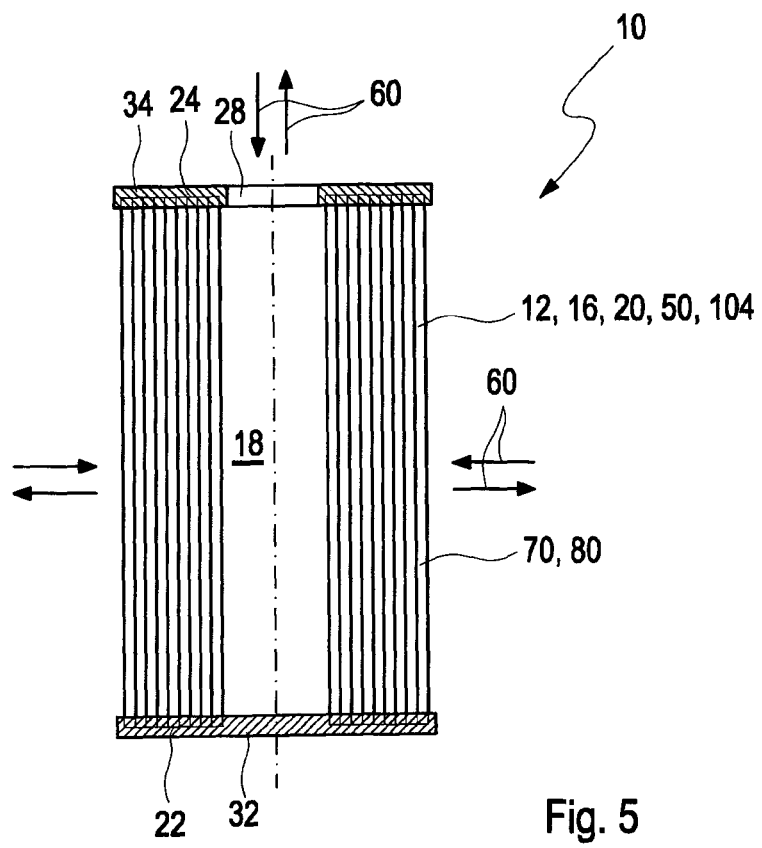
FIG. 5 a longitudinal section of an interior air filter element having a wound filter body according to an additional embodiment with a fine filter layer integrated into the wind.
Figure 6:
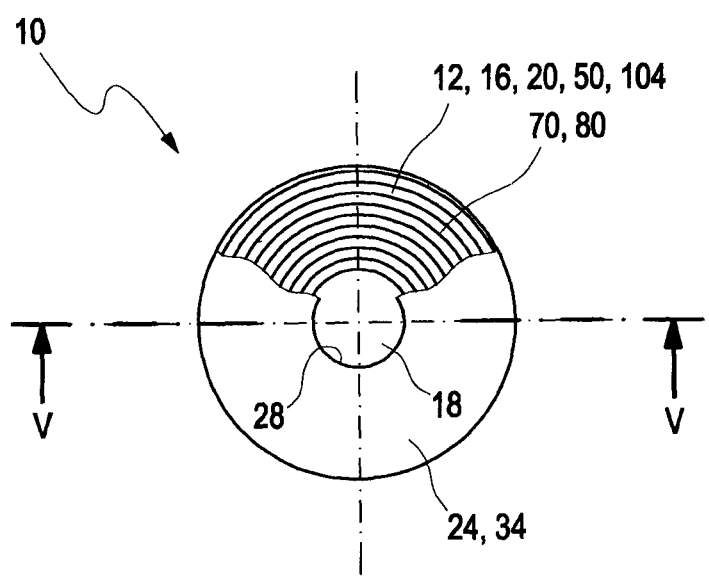
FIG. 6 a partial section of a top view of the interior air filter system according to FIG. 5.

FIGS. 5 and 6 show a sectional view and top view of another embodiment of the filter element 10 in which the wound body 20 assumes the functions of the adsorption filter region 50 as well as those of a fine filter element 70 and a particle filter element 80. Here, the particle filter element 80 is preferably disposed on the inside. This is particularly advantageous for filter elements through which media flow from the inside outward. Thus, in the case of this flow direction, the particle filter element 80 is upstream of the fine filter element 70 and the adsorption filter region 80. In the case of a flow from the outside inward, it is correspondingly advantageous for the particle filter element 80 to be disposed on the outside.

In order to produce a filter element, a partially finished product may be used in which, in addition to the immobilized absorber layer 104, a fine filter layer and a particle filter layer combined and wound to form a wound body 20. Here, the fine filter layer and/or the particle filter layer may be integrated into a carrier layer of the absorber layer 104 and/or into the covering layer covering said adsorber layer.

This structure allows for a flexible flow direction of the medium 60 to be filtered, i.e., in a first operating mode of the filter element 10, the medium to be filtered is able to enter via the channel 18 into the filter body 12, i.e., the wound body 20, and exit through the outer jacket of the wound body 20 and, in another operating mode, in the opposite flow direction.

Figure 7:
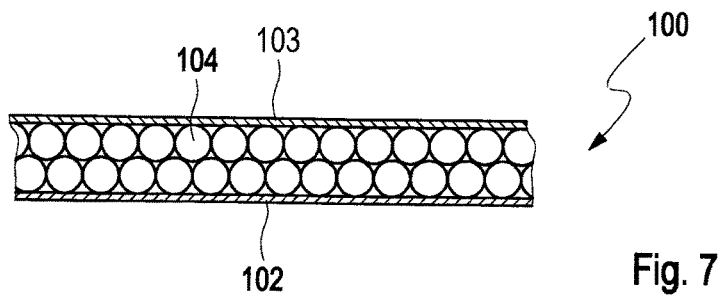
FIG. 7 the structure of a partially finished product with a carrier layer and fixed adsorber layer.

FIG. 7 illustrates a principal structure of a partially finished product with a layer 100 having a fixed pour of adsorbent particles, including a carrier layer 102, a cover layer 103, and an adsorber layer 104, for example, in the form of a poured layer, with immobilized adsorbent particles. Such a partially finished product may be used for the production of a wound body of the filter element.

Figure 7A:
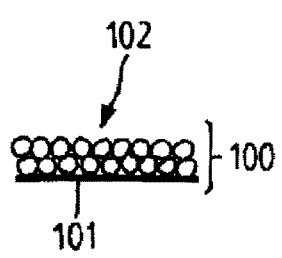
FIG. 7a a layer of a fixed activated carbon pour on a carrier layer.
Figure 7B:
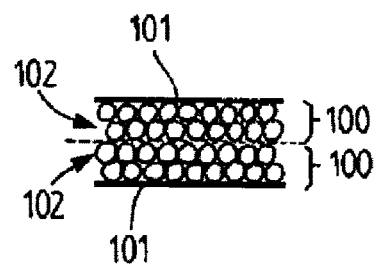

FIGS. 7a-7e show additional possible structures of an adsorption filter layer for a filter element according to the invention. FIG. 7a shows a layer 100 of a fixed pour of activated carbon particles, including a carrier layer 101 and a pour layer 102 with activated carbon particles.

Two of these layers may be combined in various ways to form partially finished products, which may constitute an adsorption filter layer as a single layer or as multiple layers. In the embodiment according to FIG. 7b, two such layers 100 are disposed one a top the other in such a way that the respective pour layers 102 rest one atop the other, forming a partially finished product limited on both sides by the carrier layers 101. A plurality of these partially finished products may be stacked one atop the other in order to form a full adsorption filter layer.

Figure 7C:
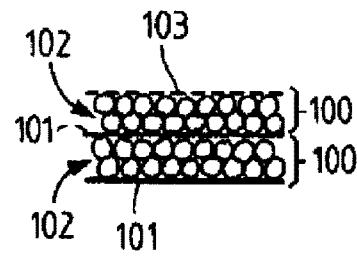

In the embodiment according to FIG. 7c, two such layers 100 are disposed one atop the other in the same orientation; however, a greater number of such layers 100 may also be disposed one atop the other in this manner. In order to form a closed adsorption filter layer, a cover layer 103 may be applied to the pour layer 102.

Figure 7D:
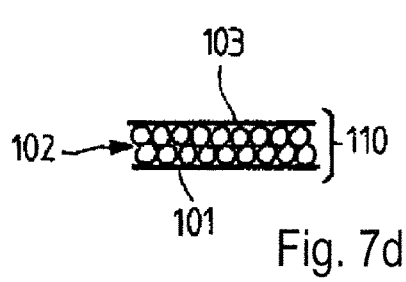
FIG. 7d a partially finished product of an adsorption filter layer made of one layer according to FIG. 7a and a cover layer.
Figure 7E:
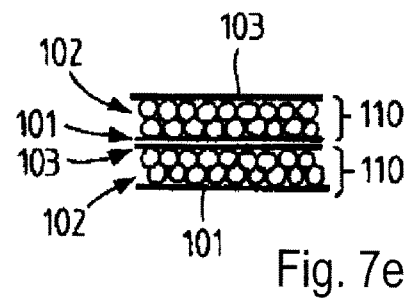
FIG. 7e an adsorption filter layer made of two layers of a partially finished product according to FIG. 7d.

FIG. 7d shows an embodiment of a partially finished product 110 with a layer 102 of a fixed pour of activated carbon particles that are applied to a carrier layer 101 and covered by a cover layer 103. The partially finished product 110 may form a full adsorption filter in a single layer or, as shown in FIG. 7e, in a two-layer or multilayer arrangement of partially finished products 110 resting one atop the other.

The pour layers 102 are connected in the embodiments by means of fine nets of adhesive thread to the respective carrier and cover layers; however, other connection methods may also be selected.

The carrier layer 102 may at least partially provide the function of a particle filter element and, optionally, also that of the fine filter element.

The respective partially finished product is wound on an inner core with a suitable diameter, for example, 30 mm to 60 mm in diameter, to form a wound body (round element). During the winding process, sealing occurs on both lateral ends of the carrier layers 101 and additional layers. This may occur, for example, via an adhesive, foam, Thermoplast, or clamp or in a welding or dosing process or a combination thereof. The sealing of the axial cut edges of the last layer also occurs using the options listed above. The end region is fixed (a few millimeters, preferably approximately 5 mm up to several centimeters) by adhesion to the layer located therebelow by means of the seal and/or by means of additional fixing elements such as adhesive, adhesive nets, adhesive lattices, rubbers, cylindrical air-permeable element (s) (lattice, filter material, or porous full material), clamps, or fibers, wires, etc. placed in the layer which are then wound completely around the entire wind in their extension at least once and fixed to the layer located therebelow (filter layer or fiber/wire layer), for example, by welding, adhesion, sewing.

In order to prevent medium from flowing around the adsorber layer 104 and thus to prevent leakage, the wound layers should be additionally sealed in the edge region of the wound body. This sealing may occur by means of a subsequent thermoplastic deformation (for example, melting by means of ultrasound, he reflectors, infrared radiation, heated air with subsequent deformation via pressing) of the sealing element and/or with the use, for example, of hot melt adhesives directly during the winding process if the subsequent layer is wound on to the previous layer and the adhesive is still sufficiently fluid in the edge region of the layers that it can bond in a sealing fashion with the adhesive of the previous layer.

The structure of the activated carbon layers may comprise the following variants:
(a) carrier layer 102 (for example, simple spunbond fabric)—adsorber layer 104—carrier layer 102
(b) carrier layer 102—adsorber layer 104—particle nonwoven (for example, nonwoven provided with meltblown)
(c) particle nonwoven—adsorber layer 104—particle nonwoven
(d) carrier layer 102—adsorber layer 104—particle nonwoven—adsorber layer 104—carrier layer 102
(e) carrier layer 102—adsorber layer 104—particle nonwoven The particle nonwoven may be made of cellulose or synthetic material.

An additional option lies in at least two adsorbents being applied one behind the other in the wound layer and thus a different adsorbent being located in the internal region of the wind (for example, over three layers) than in the outer region. Here, it is not necessary for the adsorbents to be applied to the same and/or on a single piece of carrier layer and/or cover layer.

For the removal of particles, a particle removal media may optionally be applied to the jacket surface of the wound body in the form of a flat layer and/or in a folded embodiment, that optionally is provided with the same or one of the above described options for face-side sealing or may be disposed as a separate insertable or slidable element.

In the folded embodiment, the face side may also be sealed via a sideband, a film, or a curing adhesive layer.

In the core of the wound body, a particle/aerosol removal element may be integrated that either is attached directly before the exit of the material to be filtered or represents the innermost layer of the wound body. Here, the particle/aerosol remover may be attached as a separate element or as an integrated variant, with the integrated variant being a special material or optionally the carrier layer 102 being used as a particle layer. In the variant directly before the exit of the medium to be filtered, the particle filter may be connected to the connector element as one piece (welding) or in multiple pieces (adhesive/clamping/pressing [for example, open-pored foam]).

The realization of the connection geometry on the wound body occurs, for example, via a support element that extends from a face side into the wound body and is connected to the face-side seal of the wound body in an airtight fashion. Depending upon the protrusion depth of the support into the wound body, it is logical with regards to stability for a contact surface to be formed on the support on which is the face side of the wound body rests. Depending on the design of the support, a protrusion by the support into the wound body can be completely omitted if a sufficiently firm connection of the face side seal to the support can be achieved by means of, for example, adhesion connection/adhesive force (adhesion/cohesion). Optionally, a corresponding support element may also be applied on both faces, in which case the second support element need not necessarily have the same dimensions as the first support element. The support element may have a pine tree profile or a comparable insertion geometry for additional contact as well as a bayonet seal or a screw thread with an axial or radial seal. The use of a quick coupling is possible here as well, in which case the supports either represent the quick coupling or contain or even represent the tube piece/pipe piece that is inserted into such a coupling.

However, the support element may also comprise additional exit supports. Moreover, the exit supports may be provided with a geometry (for example, an exterior hexagon) that allows a conventional tool to print deuce a secure connection/screw connection to the air supply to the cabin. Here, the exit supports may be made of plastic or metal.

As an additional option, the exit supports may also be attached to the wound body in such a form that the supports are directly cast on the wound body with a casting compound. Here, the sealing and attachment of the face side occurs by means of the casting compound which, after hardening, may be comparably as solid as a conventional Thermoplast such as polypropylene or polyamide.

Moreover, a course dust matte may be provided for particle filtration instead of a folded particle filter or slid on in addition over the particle filter. The course dust matte may be embodied as a foam or nonwoven mat. The particle filter element can thus be changed independently of the wound body.

For the structure of adsorber layers and filter arrangements, adsorber layers may be optimized with regard to material selection (activated carbon varieties, zeolites, silica gels, metal oxides such as aluminum, copper or manganese oxide, molecular sieves such as, for example, MOFs) and surface weight in order to realize a targeted adaptation to the adsorption task.

The filter element 10 described above in various embodiments may be used as a housing-free filter system, with a connection means being connectable to the open end face for the medium to pass through to which the filter system may be connected via a media line or the like. It is also conceivable for two or more filter elements 10 or filter systems to be disposed geometrically in a series, which would correspond to a parallel connection with regard to flow.

Figure 8:
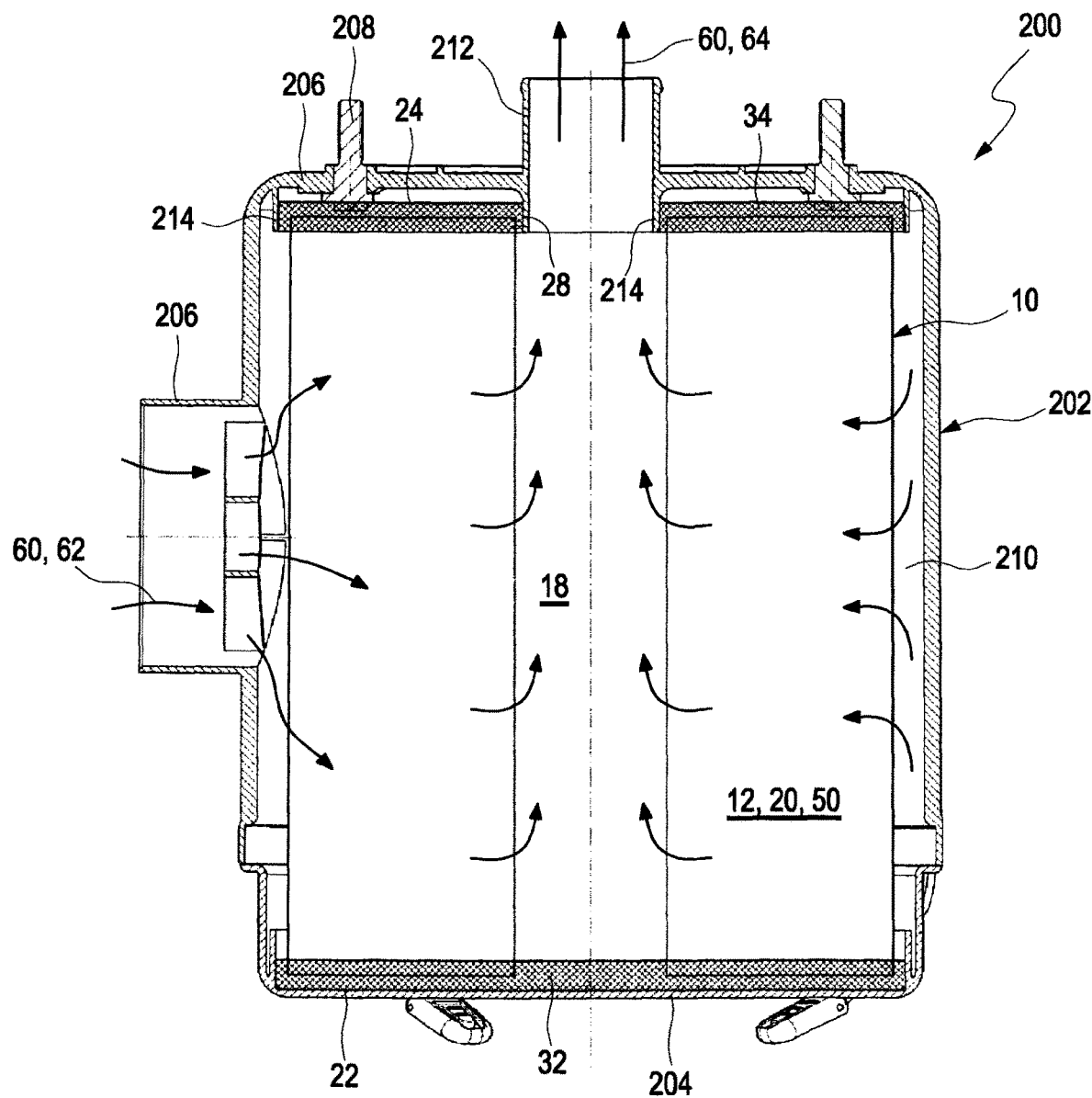
FIG. 8 a longitudinal section of an interior air filter system having a wound filter body according to an additional embodiment.

FIG. 8 shows a structure of the filter system 200 having a filter housing 202 in which a filter element 10 with an adsorption filter region 50 in the form of a wound body 20 is disposed. The medium 60 to be filtered, for example, untreated air 62, travels inside through an intake support 206 in the jacket surface of the housing 202.

The filter element 10 is embedded with its lower face side 22 in a closed end plate 32 and with its upper face side 24 in an end plate 34 having a central opening 28 into which a connector support 212 protrudes with a collar 214. The end plate 34 surrounds the caller 214 at its opening 28 in a sealing fashion such that the filtered side of the filter element 10 is separated from the unfiltered side in a sealed fashion.

The filter elements 10 may be removed from the housing 202 in that its cover is opened on the housing base 204. By closing the cover, the filter element 10 axially spans between the housing base 204 and the upper housing region 206.

On the housing side opposite the housing base 204, fastening means 208, for example screws, are disposed in the upper housing region 206 by means of which the filter housing 202 may be securely attached to an installation location.

Between the filter housing 202 in the filter body 12 is an open space 210 through which a medium 60 to be filtered, for example unfiltered air 62, flows to the filter element 10. After flowing through the filter element 10, the filtered medium 60, for example, filtered air 64, flows into the channel 18 closed on one side and subsequently via a housing support 212 out of the filter system 200.

FIGS. 9 to 16 show variants of sealing options between the unfiltered side and the filtered side of the filter element.

Figure 9:
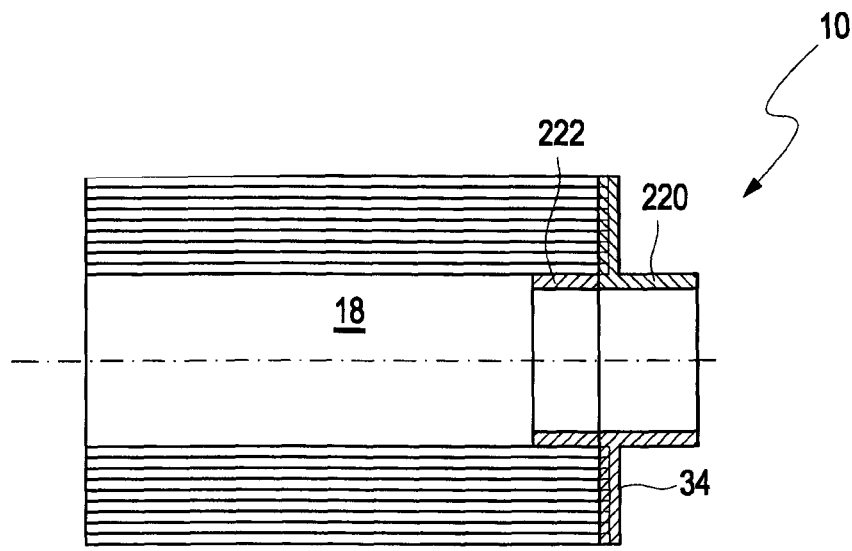
FIGS. 9-15 various sealing variants for a filter element.

FIG. 9 shows a sealing profile of an end plate 34 with a projection 220 director outward, with its sealing surface being disposed radially inward. This allows a radial seal on the inner diameter of the projection 220 and a sealed region outside of the filter element 10.

Alternately were additionally, the projection 220 may also comprise a collar 222 projecting into the channel 18 of the filter element 10 that allows a radial seal on the inner diameter of the filter element 10 and thus allows a sealed region inside the filter element 10.

Figure 10:
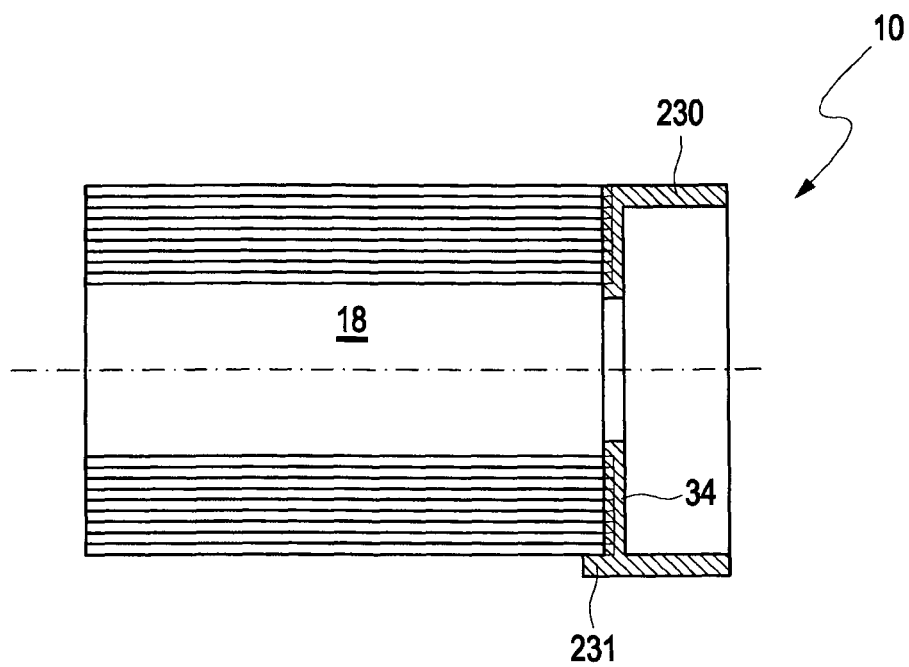

FIG. 10 shows two alternatives of sealing surfaces that allow for a radial seal. Here, via a sealing surface 230 directed radially inward or a sealing surface 231 directed radially outward on the end plate 34, a seal against a corresponding surface of a housing or connector means (not shown) is allowed. The sealing surfaces 230, 231 may be formed on a circulating edge on the end plate 34 that extends away from the filter element 10 in an axial direction.

Alternatively or additionally, a collar 231 may be placed on the end plate 34 as a sealing profile that extends in the direction of the filter element 10 and covers its upper edge, which allows a radial seal on the outer diameter of the filter element 10.

Figure 11:
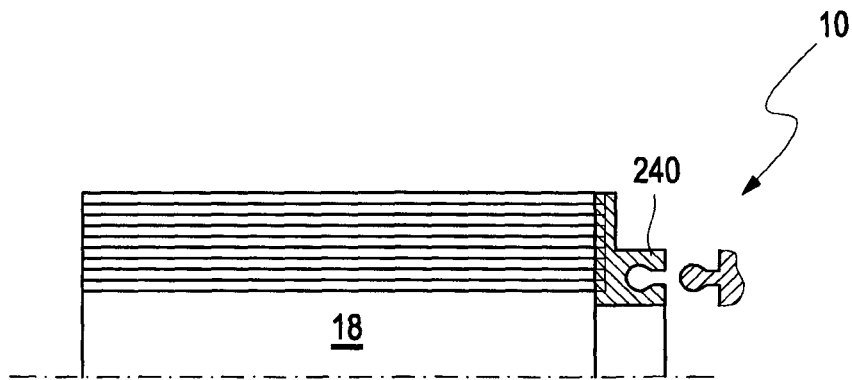

FIG. 11 shows a variant of a sealing profile 240 with a key-and-lock profile in which two sealing lips running around the end plate 34 are provided that extend axially away from the filter element 10. A counter element (not shown) with a complementary omega profile may engage in a sealing fashion between the two sealing lips such that the filter element 10 is radially sealed.

Figure 12:
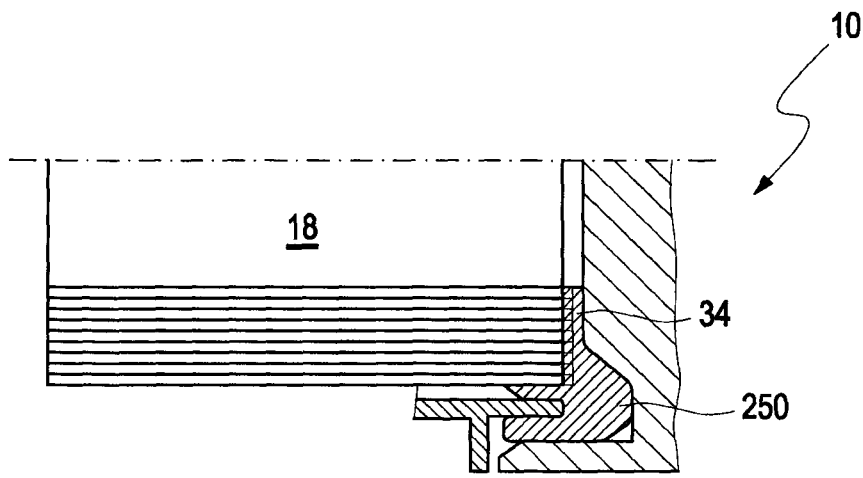

FIG. 12 shows a radially acting seal. The end plate 34 is preferably made of a castable material such as polyurethane, for example, polyurethane foam, and connected in a fixed fashion to a face of the wound filter element 10. The endplate comprises a sealing profile 250 on its outer circumference that comprises a groove running parallel to the middle axis of the filter element having one or preferably two annular, radially acting sealing surfaces in which a housing-side bar or a housing-side edge is able to engage that may be brought into contact with the sealing surfaces in a sealing fashion. The sealing profile 250 may preferably surround the edge of the filter element 10 in a sealing fashion. A corresponding filter housing may engage with a collar in a sealing fashion between the sealing lips and be fixed in a sealing fashion with a cover or the like. Here, it is preferable for the sealing profile 250 to be radially supported by another housing part, for example, by a housing cover, preferably in such a way that the sealing effect on the sealing surfaces is guaranteed.

Figure 13:
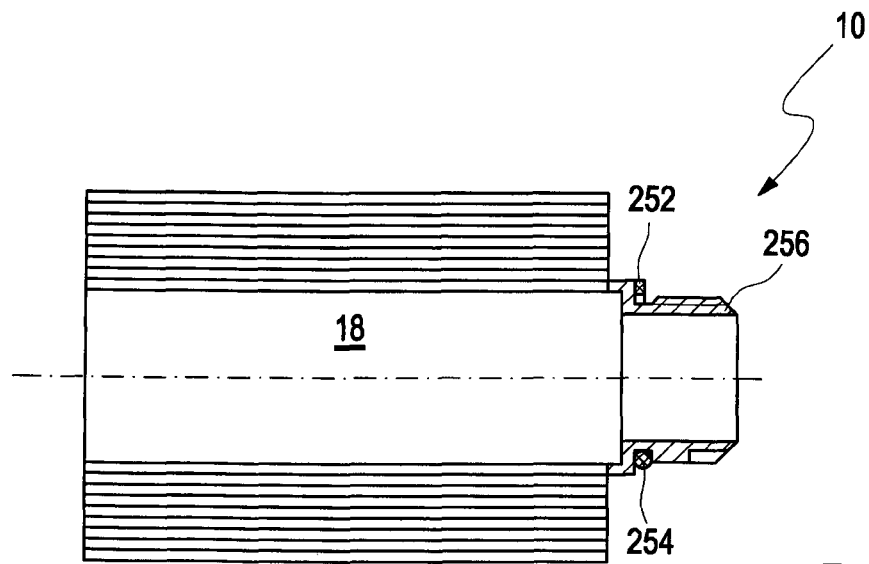

FIG. 13 shows a filter element 10 having a support 256 with a thread or a bayonet closure that extends axially away from the filter element 10. The support 256 may be placed on a central tube that is disposed in the channel 18 (not shown) or on the endplate 34.

In a first variant, an axial seal may be achieved by a sealing ring 252 running around the support 256 (shown in the upper half of the image). In another variant, which is shown in the lower half of the image, a circulating sealing ring 254 may be disposed in a groove on the outside of the support 256, thus achieving a radial seal. The seal 252, 254 may, for example, be an O-ring, a flat seal, or a 2K seal.

Figure 14:
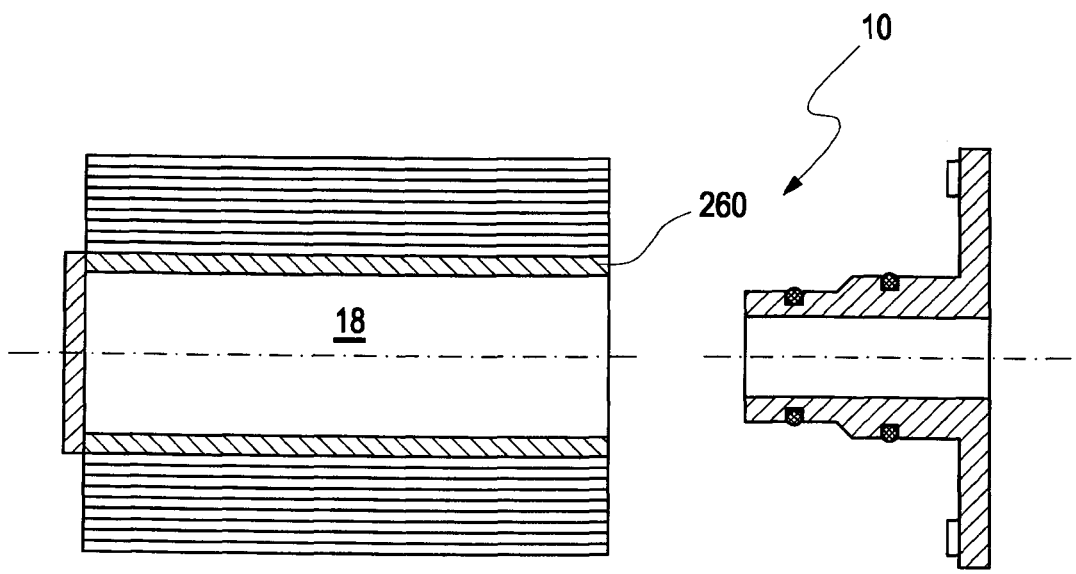

FIG. 14 shows a variant in which the filter element 10 is wound on a winding core 260. The winding core 260 comprises a recess for a separate or injected seal (not shown). This seal may be embodied as a radial and/or axial seal. The filter element 10 remains on the winding core 260, which forms a central tube in the filter element 10 and may be embodied with an open or closed base.

Figure 15:
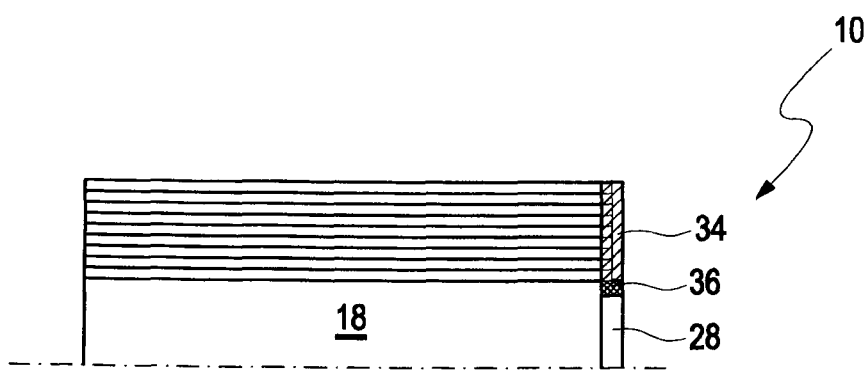

FIG. 15 shows a variant in which a radial seal occurs via the endplate 34 that extends on its inner diameter with a lip 36 into the opening 28. The seal, for example, a nonwoven ring, is a component of the endplate 34.

Figure 16:
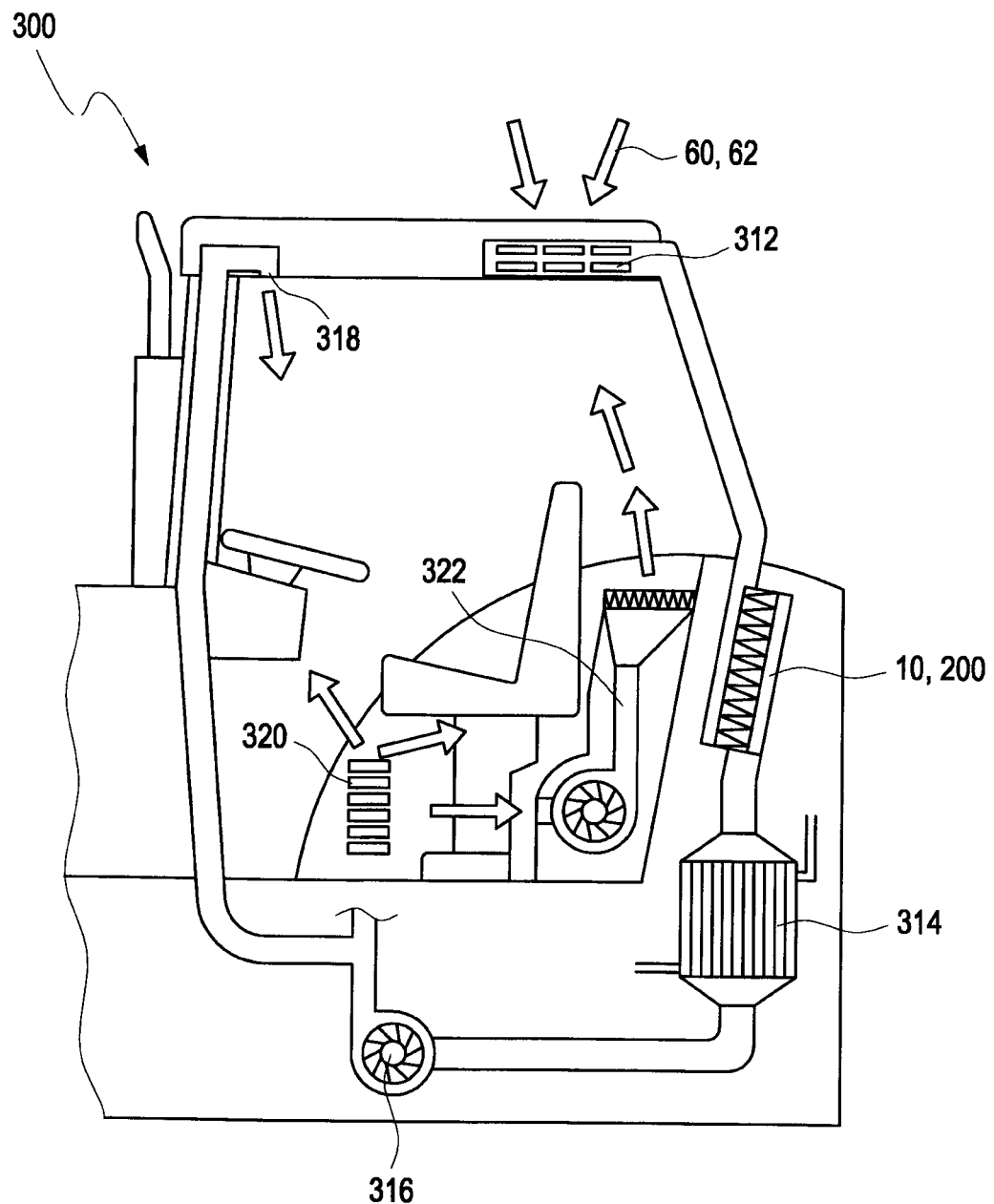
FIG. 16 a driver's cabin having an interior air filter system.

FIG. 16 shows a driver's cabin 300 of an agricultural vehicle having an interior air filter system 200. Fresh air 62 is suctioned into the interior air filter system 200 by means of a ventilator 316 through an inlet 312 and arrives in a climate controlled device 314 via the interior air filter system. The climate control and filtered air arrives into the interior via outlets 318 in 320 and is partially circulated by means of a circulation unit 322.

In addition to a flow from outside to the inside, as shown in the exemplary embodiments above, an interior air filter element according to the invention may naturally also be flowed through in a reverse direction, i.e., from inside to outside.

What is claimed is:

1. An interior air filter element of a driver's cabin of agricultural and working machines adapted to filter air having dust, and/or harmful gases and/or aerosols from spraying or sprinkling devices for pest control media or fertilizers, comprising:
    a wound filter body having an adsorption filter region having an absorbent;
    a plurality of adsorption filter layers, including:
        at least one adsorption filter layer of immobilized adsorber agents comprising an activated carbon medium;
        wherein the plurality of adsorption filter layers include a carrier layer on which the adsorber agents are arranged;
        a fine filter medium is provided as one or more fine filter layers that are folded in the shape of a zigzag and made of a glass fiber medium or a synthetic HEPA filter medium;
    one or more particle pre-filtration layers arranged upstream of the fine filter medium for removal of dust particles before they reach the one or more fine filter layers;
    wherein the one or more particle pre-filtration layers is arranged upstream of the one or more fine filter layers which is upstream of the plurality of adsorption filter layers;
    wherein the one or more particle pre-filtration layers and the one or more fine filter layers are integrated as a prefilter region formed as a folded filter bellows having the one or more particle pre-filtration layers placed one atop another and then atop the one or more fine filter layers.

2. The interior air filter element according to claim 1, wherein
    the fine filter medium is a glass fiber medium having one or two cover layers made of a spunbonded fabric.

3. The interior air filter element according to claim 2, wherein
    the one or more fine filter layers are one or more HEPA fine filter layers for removal of aerosols, the one or more HEPA fine filter layers comprising glass fibers or glass fiber paper and arranged upstream of and on an inflow side of the plurality of adsorption filter layers;
    wherein the one or more HEPA fine filter layers are configured to capture droplets and fine particles;
    the one or more particle pre-filtration layers is arranged upstream of the one or more HEPA fine filter layers which is upstream of the plurality of adsorption filter layers.

4. The interior air filter element according to claim 1, wherein
    the plurality of adsorption filter layers include at least one additional adsorption filter layer of an immobilized adsorber agent selected from the group consisting of:
    aluminum oxide, copper oxide, or manganese oxide, and molecular sieves from the group consisting of MOFs, organo-clays, nanoclay(s), silica gel, silicon oxide, zeolites, and mixtures of these additional adsorber agents.

5. The interior air filter element according to claim 1, wherein
    the immobilized adsorber agents comprise a hydrophobic activated carbon.

6. The interior air filter element according to claim 3, wherein
    the plurality of adsorption filter layers, the one or more fine filter layers and the one or more particle pre-filtration layers are disposed resting directly on top of each other within the interior air filter element.

7. An interior air filter system for a driver's cabin of agricultural and working machines, including
    an interior air filter element according to claim 1;
    a housing into which the filter element is received;
    wherein the housing includes an air inlet and an air outlet in which the interior air filter element separates the inlet side from the outlet side in a sealing fashion.

8. The interior air filter element according to claim 6, wherein
    the immobilized adsorber agent is formed from polymer fibers or coconut shell forming a pour layer of hydrophobic adsorbent particles overlaid directly onto the cover layer and configured to adsorb harmful gases from the air, the pour layer having the hydrophobic adsorbent particles distributed in a range of 100 to 1200 g/m2, the pour layer immobilized onto the carrier layer by an adhesive;
    wherein the carrier layer of the plurality of adsorption filter layers comprises spunbonded or melt-blown polyester fibers or PET polyethylene terephthalate fibers.

9. The interior air filter element according to claim 8, wherein
    the hydrophobic adsorbent particles have hydrophobic properties limiting water absorption to no more than 5% by mass;
    wherein the adsorbent particles have an average diameter between 0.1 and 1.0 mm.

10. The interior air filter element according to claim 9, wherein
    the pour layer is immobilized on the carrier layer by a plurality of adhesive points or a net of adhesive fibers adhesively fixing and immobilizing the hydrophobic adsorbent layer onto the carrier layer.

11. The interior air filter element according to claim 10, wherein
    the plurality of adsorption layers are a plurality of wound layers overlaid directly on each other, without separate grooves or spacers between windings and without defined through-flow channels.

12. The interior air filter element according to claim 8, further comprising:
    a protective cover layer of spunbond polyester fibers, the protective cover layer arranged on and covering the pour layer at a side of the port layer opposite the carrier layer.

13. The interior air filter element according to claim 8, wherein
    the pour layer is distributed in a range of 400 to 1200 g/m$^2$ on the carrier layer, and has an air permeability in the range of 800 to 1200 L/m$^2$s and a pour layer thickness of 2 to 6 mm.

14. The interior air filter element according to claim 11, wherein
    the plurality of adsorption filter layers achieves on the downstream side a test the gas concentration of less than 10 µg/g according to the cyclohexane method in accordance with EN 12941:1998 with a test duration of 70 minutes measured according to EN 15695-2:2009.

15. The interior air filter element according to claim 11, further comprising a first and a second face side end plate secured onto opposite axial end faces of the interior air filter element.

\* \* \* \* \*